(12) United States Patent
Chen et al.

(10) Patent No.: US 10,673,790 B2
(45) Date of Patent: Jun. 2, 2020

(54) METHOD AND TERMINAL FOR DISPLAYING INSTANT MESSAGING MESSAGE

(71) Applicant: TENCENT TECHNOLOGY (SHENZHEN) COMPANY LIMITED, Shenzhen, Guangdong (CN)

(72) Inventors: Yaoguang Chen, Shenzhen (CN); Zongyang Li, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 52 days.

(21) Appl. No.: 15/687,034

(22) Filed: Aug. 25, 2017

(65) Prior Publication Data

US 2017/0373994 A1    Dec. 28, 2017

Related U.S. Application Data

(63) Continuation of application No. PCT/CN2016/084516, filed on Jun. 2, 2016.

(30) Foreign Application Priority Data

Jul. 23, 2015    (CN) .......................... 2015 1 0439686

(51) Int. Cl.
*G06F 15/16* (2006.01)
*H04L 12/58* (2006.01)

(52) U.S. Cl.
CPC .............. *H04L 51/04* (2013.01); *H04L 51/10* (2013.01); *H04L 51/18* (2013.01); *H04L 51/20* (2013.01); *H04L 51/34* (2013.01)

(58) Field of Classification Search
None
See application file for complete search history.

(56) References Cited

U.S. PATENT DOCUMENTS 6,332,147 B1 *   12/2001   Moran ................... G06F 16/40
                                                        715/203
8,166,383 B1 *   4/2012   Everingham ......... G06F 17/241
                                                        707/627

(Continued)

FOREIGN PATENT DOCUMENTS

CN          104267888 A       1/2015
CN          104283762 A       1/2015

(Continued)

OTHER PUBLICATIONS

International Search Report of PCT/CN2016/084516 dated Aug. 23, 2016.

(Continued)

*Primary Examiner* — Padma Mundur
(74) *Attorney, Agent, or Firm* — Sughrue Mion, PLLC

(57) ABSTRACT

A method and terminal for displaying an instant messaging message are provided. The method includes receiving, by a first terminal, a first instant messaging message and a first display location from a second terminal, the first terminal displaying a first chat interface, the second terminal displaying a second chat interface, the first chat interface displaying a first picture, the second chat interface displaying a second picture that is the same as the first picture, and the first display location being a location for displaying the first instant messaging message on the second picture; and displaying, according to the first display location, the first instant messaging message on the first picture displayed on the first chat interface.

20 Claims, 10 Drawing Sheets

(56) References Cited

U.S. PATENT DOCUMENTS

| | | | | |
|---|---|---|---|---|
| 2006/0075044 A1* | 4/2006 | Fox | ...................... | G06Q 10/107 |
| | | | | 709/206 |
| 2010/0017727 A1* | 1/2010 | Offer | ...................... | G06Q 10/10 |
| | | | | 715/753 |
| 2014/0201264 A1* | 7/2014 | Soon-Shiong | ............ | G06F 3/03 |
| | | | | 709/203 |
| 2014/0281870 A1* | 9/2014 | Vogel | .................... | G06F 17/246 |
| | | | | 715/220 |
| 2015/0156147 A1 | 6/2015 | Liu | | |
| 2016/0226932 A1* | 8/2016 | Krishna | ................ | H04L 65/403 |
| 2017/0325079 A1* | 11/2017 | Zhao | .................... | H04W 88/02 |

FOREIGN PATENT DOCUMENTS

| | | | | |
|---|---|---|---|---|
| CN | 104461477 A | 3/2015 | | |
| CN | 104579902 A | 4/2015 | | |
| CN | 104796487 A | 7/2015 | | |
| WO | 2011/085248 A1 | 7/2011 | | |
| WO | WO-2013183968 A1 * | 12/2013 | ........... | H04L 65/403 |
| WO | WO-2015003605 A1 * | 1/2015 | ............ | H04L 51/04 |

OTHER PUBLICATIONS

Communication dated Apr. 22, 2019, from the State Intellectual Property Office of People's Republic of China in counterpart Application No. 201510439686.9.

Written Opinion in International Application No. PCT/CN2016/084516, dated Aug. 23, 2016.

Communication dated Nov. 27, 2019, from The State Intellectual Property Office of the P.R. of China in counterpart Application No. 201510439686.9.

* cited by examiner

METHOD AND TERMINAL FOR DISPLAYING INSTANT MESSAGING MESSAGE

RELATED APPLICATION

This application is a Continuation of PCT International Application No. PCT/CN2016/084516 filed on Jun. 2, 2016, which claims priority under 35 U.S.C § 119(a) to Chinese Patent Application No. 201510439686.9, entitled "METHOD AND APPARATUS FOR DISPLAYING INSTANT MESSAGING MESSAGE", filed on Jul. 23, 2015 in the State Intellectual Property Office, which are incorporated by reference in their entirety.

FIELD

Apparatuses, methods, and devices consistent with the present disclosure relate to the field of network technologies, and in particular, to a method and terminal for displaying an instant messaging message.

DESCRIPTION OF RELATED ART

With the development of network technologies such as the Internet and the popularization of intelligent terminals, information exchanged between users is converted from conventional short message service (SMS) messages into instant messaging messages for sending over the Internet. In related art instant messaging technology a user not only can send an instant messaging message to another user, but also can set up a group of users, and send an instant messaging message to multiple other users in the group at the same time. In addition, the instant messaging message may be text or speech, or may be a picture, a video, or the like. The multiple other users of the group may then reply to the instant messaging message.

SUMMARY

According to one or more exemplary embodiments, there is provided a method for displaying an instant messaging message, the method comprising receiving, by a first terminal, a first instant messaging message and a first display location from a second terminal, the first terminal displaying a first chat interface, the second terminal displaying a second chat interface, the first chat interface displaying a first picture, the second chat interface displaying a second picture that is the same as the first picture, and the first display location being a location for displaying the first instant messaging message on the second picture; and displaying, according to the first display location, the first instant messaging message on the first picture displayed on the first chat interface.

According to one or more exemplary embodiments, there is provided a terminal for displaying an instant messaging message, the terminal comprising one or more processors; and a memory, the memory storing one or more programs, the one or more programs being configured to be executed by the one or more processors, and the one or more programs comprising instructions for performing operations of receiving a first instant messaging message and a first display location from a second terminal, the terminal displaying a first chat interface, the second terminal displaying a second chat interface, the first chat interface displaying a first picture, the second chat interface displaying a second picture that is the same as the first picture, and the first display location being a location for displaying the first instant messaging message on the second picture; and displaying, according to the first display location, the first instant messaging message on the first picture displayed on the first chat interface.

According to one or more exemplary embodiments, there is provided an instant messaging method performed by a first terminal, the instant messaging method comprising receiving, by the first terminal, an instant messaging (IM) message and a display location for displaying the IM message on a picture that is already displayed on a chat interface of the terminal at a time of receiving the IM message, where the display location indicates a location on the picture; and displaying, by at least one microprocessor, the IM message on the picture at the display location.

BRIEF DESCRIPTION OF THE DRAWINGS

The above and other aspects will become apparent from the following description of exemplary embodiments, with reference to the accompanying drawings in which.

DESCRIPTION OF EXEMPLARY EMBODIMENTS

The following clearly and completely describes exemplary embodiments with reference to the accompanying drawings in which various exemplary embodiments are shown. The described exemplary embodiments are merely illustrative, and other exemplary embodiments may be obtained by a person of ordinary skill in the art based on the exemplary embodiments described herein and all such exemplary embodiments fall within the protection scope of the claims provided herein.

According to related art instant messaging technology, when a user sends a picture to multiple other users in a group and the other users start a discussion based on the picture, an instant messaging server sends an instant messaging message about the picture to a terminal of each user in the group.

At the terminal of each user, an instant messaging message that is already displayed on a chat interface displayed on the terminal is moved upwards to vacate a display location, and the newly received instant messaging message is displayed at the display location. However, in the related art instant messaging technology, when there are excessively many instant messaging messages being sent by various users, creating a discussion about the picture, the picture may be moved out of the chat interface (i.e., the picture may be moved out of the window on the terminal such that the picture is no longer visible to the user of the terminal). Accordingly, when the user wants to view the picture, the user needs to drag a scroll bar upwards, to display the picture on the currently-displayed chat interface. Sometimes, when viewing the instant messaging messages about the picture, the user further needs to refer to the picture, that is, the user needs to view the picture while viewing the instant messaging messages about the picture. To view the instant messaging messages about the picture with reference to the picture, the user needs to drag the scroll bar back and forth, to alternately display the picture and the instant messaging messages about the picture on the chat interface, resulting in low viewing efficiency.

Figure 1A:
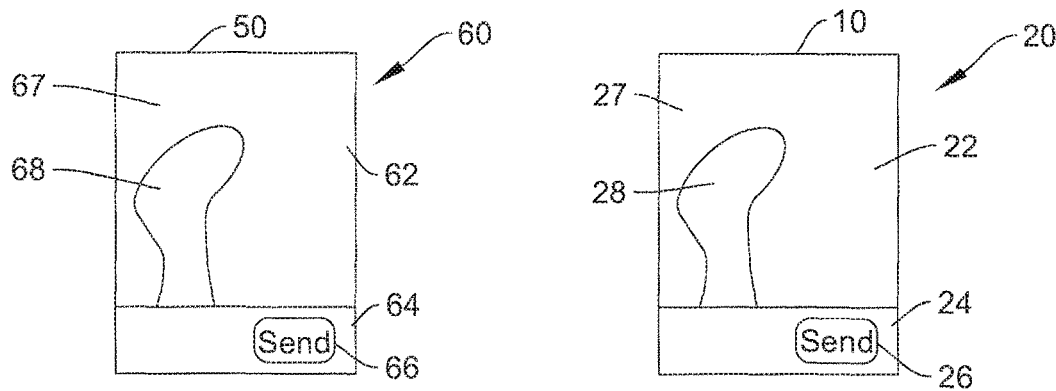
FIGS. 1A to 1D are illustrations showing an example of an operation of a method for displaying an instant messaging message according to an exemplary embodiment.
Figure 1B:
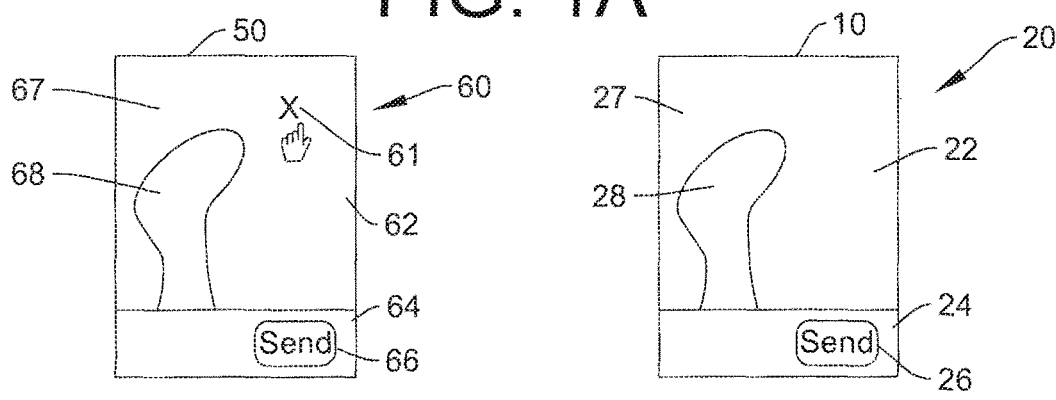
Figure 1C:
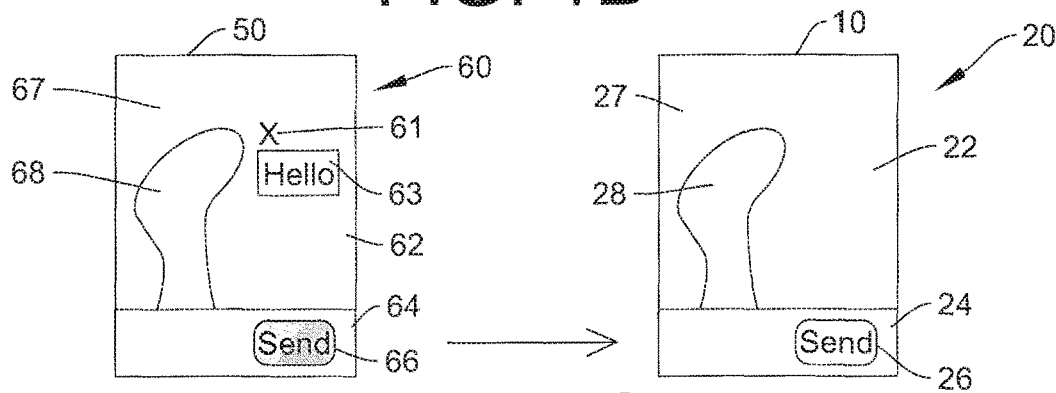
Figure 1D:
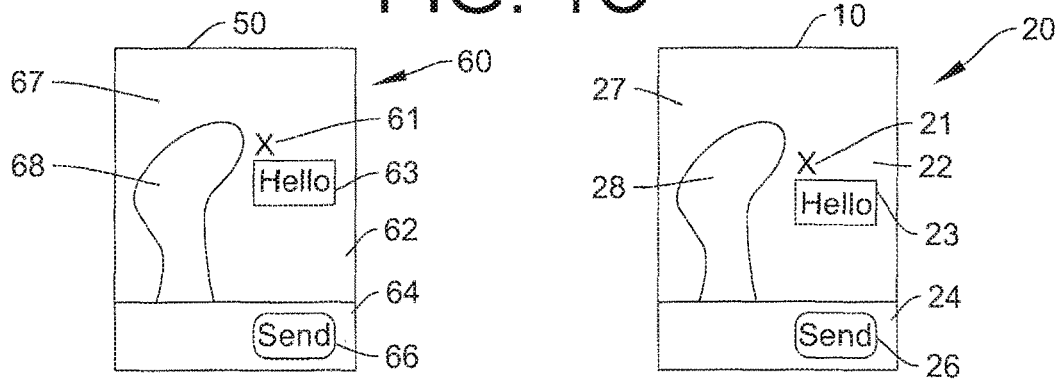

Exemplary embodiments improve on the related art instant messaging technology by directly displaying the instant messaging messages about a picture at a specified location on the picture, thus increasing viewing efficiency. In this way, the instant messaging messages about the picture can be viewed while viewing the picture. FIGS. 1A to 1D illustrate an example of an operation of a method for displaying an instant messaging message according to an exemplary embodiment. As shown in FIG. 1A, a first terminal 10 displays a first chat interface 20, and a second terminal 50 displays a second chat interface 60. For example, the first chat interface 20 may have a display window 22 and a control window 24 that includes a send button 26 for sending an instant messaging message. Similarly, the second chat interface 60 may have a display window 62 and a control window 64 that includes a send button 66 for sending an instant messaging message. It will be appreciated that this is only an example and the arrangement of the windows and the buttons included in the windows may be more or less than those shown. The second chat interface 60 displays a picture 67, for example a picture including a tree 68. The first chat interface 20 also displays a picture 27, for example a picture including a tree 28. That is, the first chat interface 20 displays the same picture as the second chat interface 60. For example, the picture may have already been sent as a prior instant messaging message. As shown in FIG. 1B, when wanting to send an instant messaging message about the second picture 67 to a first user, a second user selects a display location 61 for displaying the instant messaging message on the second picture 67. As shown in FIG. 1C, the second user enters an instant messaging message 63, e.g., "Hello", at the display location 61 and presses the send button 66 in the control window 64 to send the instant messaging message 63 and the display location 61 to the first terminal 10. As shown in FIG. 1D, the first terminal 10 receives the instant messaging message and the display location and displays, according to the received display location 21, the received instant messaging message 23 on the picture 27 displayed on the first chat interface 20, so that the first user may view the picture 27 without dragging a scroll bar, and may view the instant messaging message 23 with reference to the first picture 27 without dragging the scroll bar, thereby improving the viewing efficiency.

Figure 2:
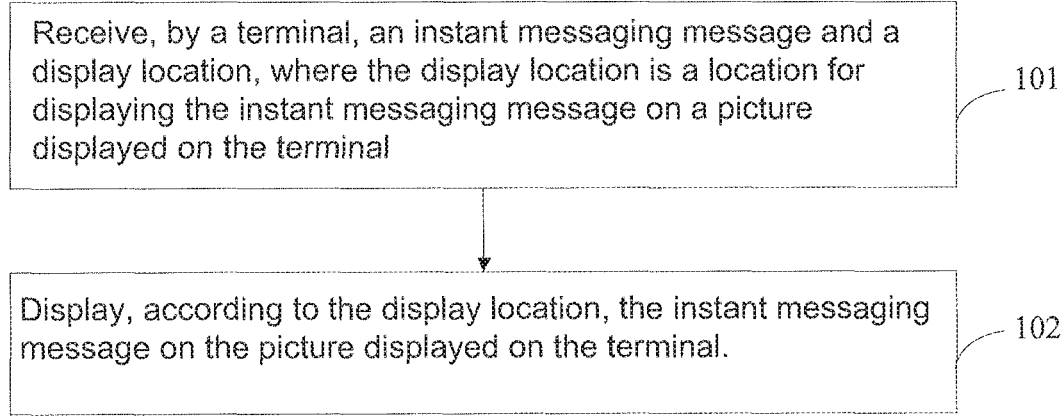
FIG. 2 is a flowchart of the method for displaying an instant messaging message according to the operation of FIGS. 1A to 1D.

FIG. 2 is a flowchart of the method for displaying an instant messaging message according to the operation of FIGS. 1A to 1D. The method includes the following operations:

Operation 101: The first terminal 10 receives an instant messaging message 63 and a display location 61 that are sent by the second terminal 50, where the display location 61 is a location for displaying the instant messaging message 63 on a picture 27 displayed on the first terminal 10.

Operation 102: Display, according to the display location 63, the instant messaging message 61 on the picture 27 displayed on the first terminal 10.

When sending an instant messaging message 63 to a first user, a second user selects a display location 61 for displaying the instant messaging message 63 on a picture 67 displayed on a second chat interface 60 of a second terminal 50. The second terminal 50 sends the instant messaging message 63 and the display location 61 to a first terminal 10, so that the first terminal 10 displays, according to the display location 61, the received instant messaging message 23 on a picture 27 displayed on a first chat interface 20. In this way, the first user may view the picture 27 without dragging a scroll bar, and may view the instant messaging message 23 with reference to the picture 27 without dragging the scroll bar, thereby improving the viewing efficiency.

Figure 3:
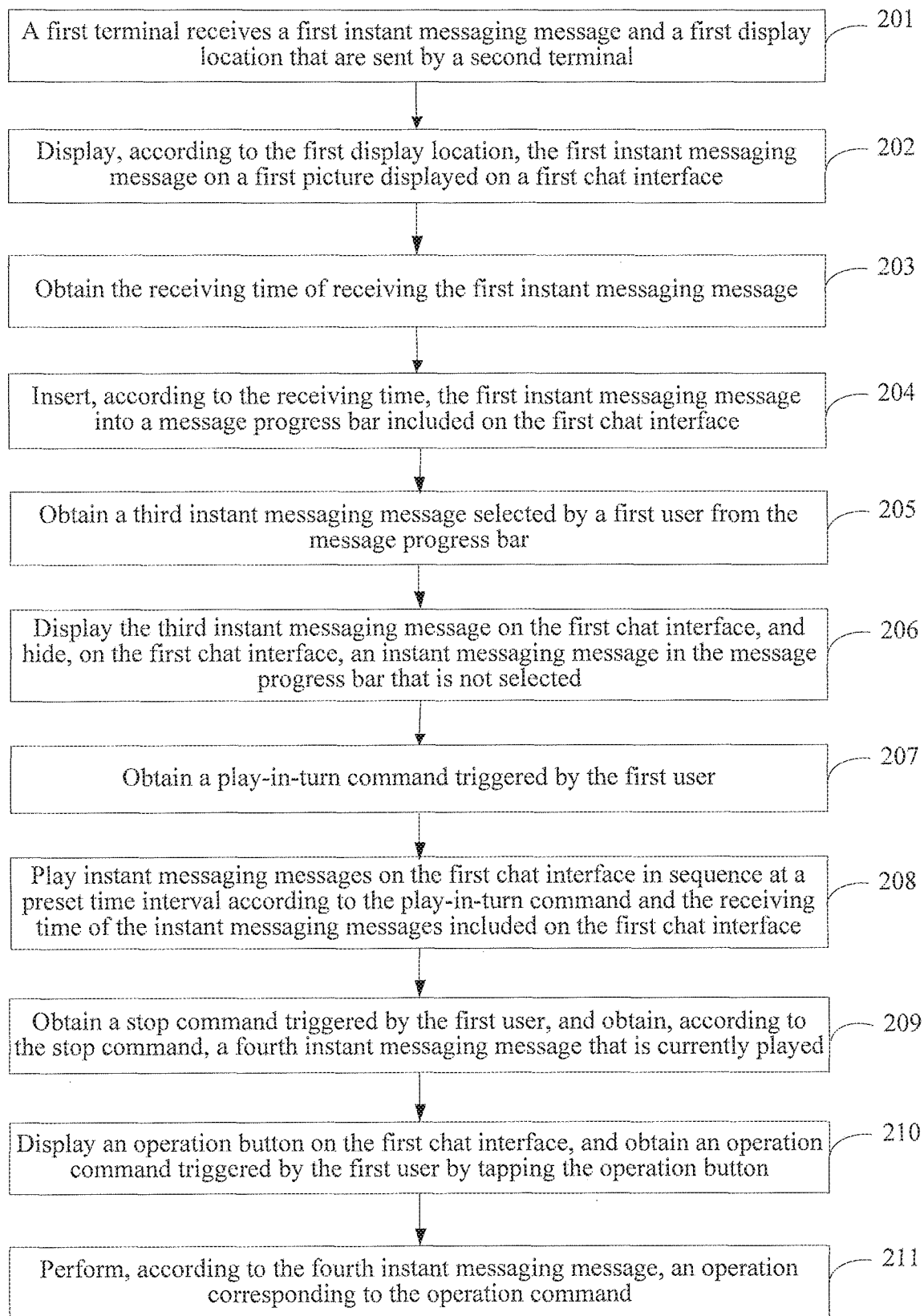
FIG. 3 is a flowchart of a method for displaying an instant messaging message according to another exemplary embodiment.

FIG. 3 is a flowchart of a method for displaying an instant messaging message according to another exemplary embodiment. Referring to FIG. 3, the method includes the following operations:

Operation 201: The first terminal receives a first instant messaging message and a first display location that are sent by a second terminal.

The operation may be implemented by means of the following operation (1) to operation (4), including:

(1): The second terminal obtains the first instant messaging message and the first display location.

The first terminal is a terminal corresponding to a first user, and the second terminal is a terminal corresponding to a second user. The first user and the second user are friends, or the first user and the second user are in a same group. The first terminal displays a first chat interface, the second terminal displays a second chat interface, the first chat interface displays a first picture, the second chat interface displays a second picture, and the first picture is the same as the second picture. For example, the first and second pictures may be exchanged as a prior instant messaging message, such that both the first terminal and the second terminal display the same picture.

The first picture and the second picture include but are not limited to a blank, a text, a dynamic image, a video, or the like.

When the second user wants to send the first instant messaging message to the first user, the second user selects, as the first display location, a display location on the second picture displayed on the second chat interface of the second terminal, enters the first instant messaging message in an input box of the second terminal, and taps a send button to trigger a first sending command to the second terminal. The second terminal obtains the first instant messaging message and the first display location according to the first sending command. Further, the second terminal may further obtain a user identifier of the second user.

The user identifier of the second user may be a profile picture, a nickname, or the like of the second user. When the second user selects the first display location, the second user may select the first display location in any touch manner that includes but is not limited to a tap, a double-tap, or a touch and hold. An operation of obtaining the first display location by the second terminal may be: obtaining a touch location of the second user on the second terminal, and calculating the first display location according the touch location and to a location for displaying the second picture on the second chat interface.

The first display location may be any location on the second picture. The first instant messaging message may include, but is not limited to, a text, a speech, a picture, a video, or the like. In addition, if the first instant messaging message is a picture or a video, the first instant messaging message may be a picture or video that is currently photographed, or may be a picture or video that is selected from a photo or video storage of the second terminal.

(2): The second terminal displays the first instant messaging message at the first display location on the second picture on the second chat interface.

The second terminal obtains the current time as the sending time of sending the first instant messaging message, displays the first instant messaging message at the first display location on the second picture on the second chat interface, and displays the user identifier of the second user and the sending time of the first instant messaging message in a preset area with respect to the first display location.

The preset area may be set and modified according to a user setting. The preset area is not specifically limited. For example, the preset area may be a specified area on the top of the first display location, or a specified area on the left of the first display location, etc.

The second user may tap a location for an instant messaging message to be sent to, so that when entering the instant messaging message about a background picture, the second user does not need to first send, to the first user, an instant messaging message used for describing a location of the background picture to be described and then enter the first instant messaging message used for specifically describing content, but directly enters the first instant messaging message used for specifically describing the content, so as to shorten the time of entering the instant messaging message, thereby improving the efficiency of entering the instant messaging message.

For example, assume that a picture displayed on the second chat interface shows three ice creams each having a cream part and a cone part. Assuming that the user wants to describe a cream part of the first ice cream, in the related art, the user needs to first send, to a friend, an instant messaging message that the user wants to describe the cream part of the first ice cream, and then enters the first instant messaging message for describing the cream part of the first ice cream, resulting in low efficiency of entering the first instant messaging message. By contrast, according to the exemplary embodiment, the user only needs to select the cream part of the first ice cream as the first display location, and then directly inputs the first instant messaging message related to the cream part of the first ice cream, thereby improving the efficiency of entering the instant messaging message.

(3): The second terminal sends the first instant messaging message and the first display location to the first terminal.

In some exemplary embodiments, the second terminal may further send the user identifier of the second user to an instant messaging server in addition to sending the first instant messaging message and the first display location to the instant messaging server. That is, the messaging server receives the first instant messaging message, the first display location, and the user identifier of the second user that are sent by the second terminal, and sends the first instant messaging message, the first display location, and the user identifier of the second user to the first terminal.

(4): The first terminal receives the first instant messaging message and the first display location that are sent by the second terminal.

The first terminal receives the first instant messaging message and the first display location that are sent by the instant messaging server, and obtains the current time as the receiving time of receiving the first instant messaging message. In some exemplary embodiments, the first terminal receives the first instant messaging message, the first display location, and the user identifier of the second user that are sent by the instant messaging server, and obtains the current time as the receiving time of receiving the first instant messaging message.

Further, if the first terminal and the second terminal are in a same group, and the group further includes a third terminal other than the first terminal and the second terminal, the instant messaging server receives the first instant messaging message and the first display location, and sends the first instant messaging message and the first display location to the third terminal. The third terminal receives the first instant messaging message and the first display location that are sent by the instant messaging server.

Further, the third terminal displays a third chat interface, the third chat interface displays a third picture, and the third picture is the same as the first picture and the second picture, and includes but is not limited to a blank, a text, a dynamic image, a video, or the like.

Further, the first chat interface includes a switching button. The first user may switch the first chat interface to a fourth chat interface by tapping the switching button. The fourth chat interface is a chat interface of displaying instant messaging messages according to the receiving time of the instant messaging messages. The instant messaging messages are sent by the instant messaging server. A specific process is:

tapping, by the first user, the switching button to submit a switching command to the first terminal when the first user wants to switch the first chat interface to the fourth chat interface; and obtaining, by the first terminal, the switching command submitted by the first user by tapping the switching button, and switching the first display interface to the fourth display interface according to the switching command.

Operation 202: Display, according to the first display location, the first instant messaging message on a first picture displayed on a first chat interface.

The first instant messaging message is displayed, according to the first display location, at a first display location on the first picture displayed on the first chat interface, and the user identifier of the second user and the receiving time of receiving the first instant messaging message are displayed in a preset area of the first display location.

Similarly, the third terminal displays, according to the first display location, the first instant messaging message on the third picture displayed on the third chat interface.

Optionally, the first user may further select a display location on the first picture, and sends an instant messaging message to the second terminal corresponding to the second user. A specific implementation process is as follows.

Further, the first terminal may send a second instant messaging message and a second display location to the second terminal by means of the following operation (1) to operation (3), including:

(1): The first terminal obtains the second instant messaging message and the second display location.

When the first user wants to send the second instant messaging message to the second user, the first user selects a display location as the second display location on the first picture displayed on the first display interface of the first terminal, enters the second instant messaging message in an input box of the first terminal, and taps a sending button to trigger a second sending command to the first terminal. The first terminal obtains the second instant messaging message and the second display location according to the second sending command.

(2): The first terminal displays the second instant messaging message at the second display location on the first picture on the first chat interface.

(3): The first terminal sends the second instant messaging message and the second display location to the second terminal.

The second terminal receives the second instant messaging message and the second display location that are sent by the first terminal, and displays, according to the second display location, the second instant messaging message on the second picture displayed on the second chat interface.

The second instant messaging message includes, but is not limited to, a text, a speech, a picture, a video, or the like. In addition, if the second instant messaging message is a picture or a video, the second instant messaging message may be a picture or video that is currently photographed, or may be a picture or video that is selected from pictures or videos stored in the first terminal.

Further, when instant messaging messages on the first chat interface are overlapped, the first terminal may display, in thumbnail mode, the instant messaging messages having an overlapped part on the first chat interface, or may display the instant messaging messages in a coverage sequence, or may reduce the quantity of instant messaging messages that are currently displayed on the first chat interface.

Figure 4:
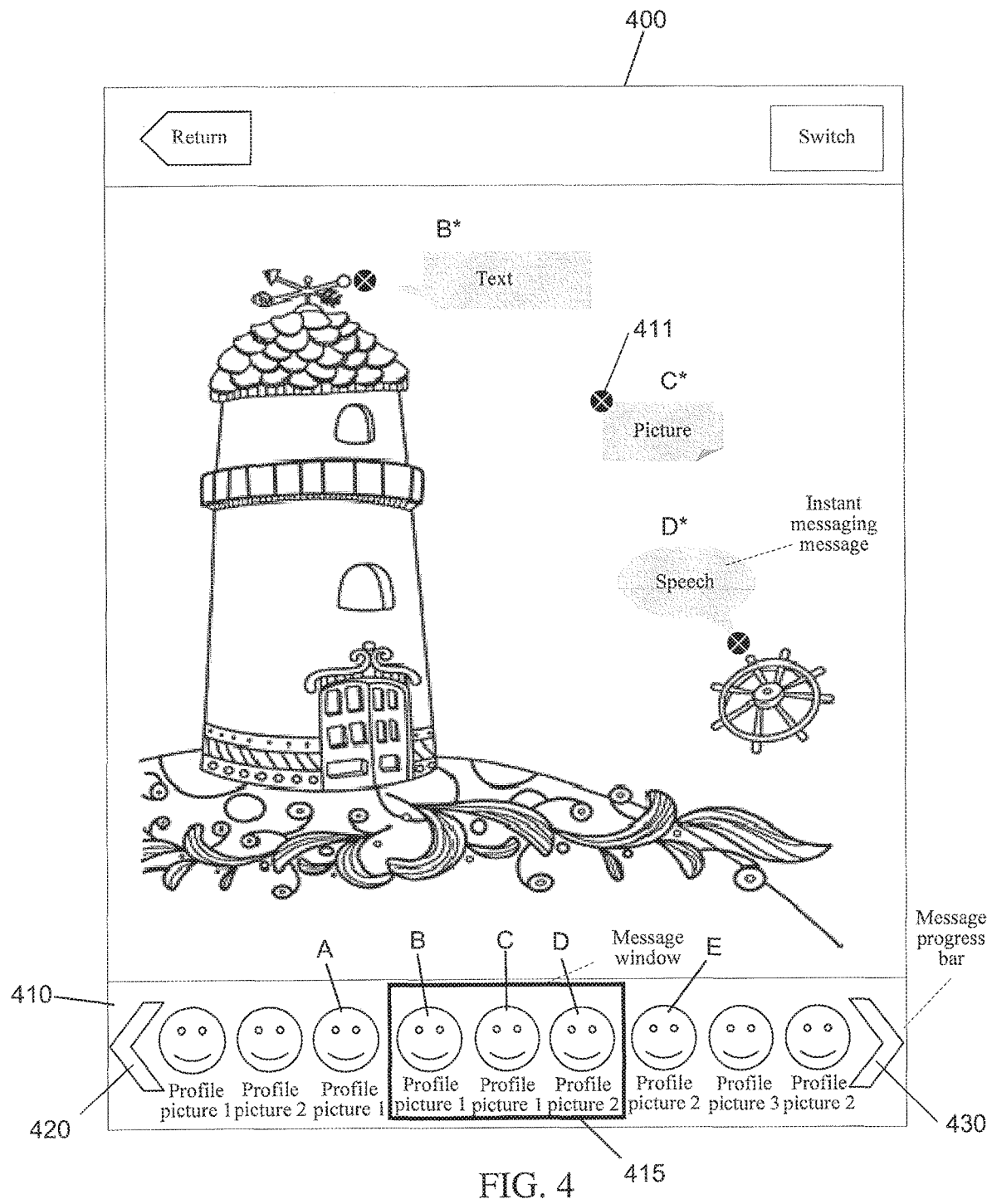
FIG. 4 is a schematic diagram of a first chat interface according to the method of FIG. 3.

Further, as shown in FIG. 4, the first chat interface 400 may include a message progress bar 410. The first chat interface 400 may be the same as the first chat interface 20 shown in FIGS. 1A to 1D. The message progress bar 410 may be used for storing indicators of instant messaging messages included on first chat interface 400. The first terminal inserts the indicators of the first instant messaging message into the message progress bar 410 by means of the following operation 203 and operation 204.

Operation 203: Obtain the receiving time of receiving the first instant messaging message.

When the first terminal displays the first instant messaging message at the first location on the first picture on the first chat interface, the first terminal also displays the receiving time of receiving the first instant messaging message. Therefore, the receiving time of receiving the first instant messaging message may be directly obtained from the first chat interface in operation 203. Alternatively, the receiving time may be obtained by a clock included in the first terminal.

It needs to be noted that there is no strict time sequence between operation 202 and operation 203. Operation 202 may be first performed, and the operation 203 is performed. Alternatively, operation 203 may be first performed, and operation 202 is performed. Alternatively, operation 202 and operation 203 may be performed at the same time.

Operation 204: Insert, according to the receiving time, the first instant messaging message into a message progress bar 410 included on the first chat interface.

Instant messaging messages in the message progress bar 410 are sorted in a sequence of the receiving time from far to close to a current time. The first instant messaging message is an instant messaging message that is currently received. Therefore, the receiving time of the first instant messaging message is closest to the current time, and the first instant messaging message is inserted at the end of the message progress bar 410 according to the receiving time. For example, as shown in FIG. 4, when the receiving time is closest to the current time, the first instant messaging message is inserted on the right side of the message progress bar 410.

The message progress bar 410 may have a data structure such as a heap, a queue, or a linked list. If the data structure is a heap, one end of the message progress bar 410 may be a heap top. If the data structure is a queue, one end of the message progress bar 410 may be a queue head.

Further, in some exemplary embodiments, a message tag (i.e., an indicator) of the first instant messaging message may be inserted into the message progress bar 410 instead of inserting the actual message of the first instant messaging message. During actual implementation: the message tag of the first instant messaging message is obtained, and the message tag is inserted into the message progress bar 410 according to the receiving time of receiving the first instant messaging message.

The message tag may be anything that can reflect a property of the message and classify the message and that occupies only a relatively small image area. For example, the message tag may be a user identifier of the first user or a thumbnail of message content of the first instant messaging message.

The user identifier of the first user may be a profile picture of the first user or a nickname of the first user.

Further, if excessively many instant messaging messages are displayed on the first chat interface, clutter and even overlapping may occur. Therefore, some instant messaging messages may be displayed on the first chat interface by means of the following operation 205 and operation 206.

Operation 205: Obtain a third instant messaging message selected by the first user from the message progress bar 410.

The operation may be implemented by means of the following operation (1) and operation (2), including:

(1): Obtain a selection command submitted by the first user by moving a message window 415 in the message progress bar 410.

The message progress bar 410 includes the message window 415. For example, referring to FIG. 4, the first picture is a picture using a tower shape as a theme. A dark-black solid dot 411 having an "X" line indicates the first display location selected by the second user when sending the first instant messaging message. The first terminal displays, on the first chat interface, instant messaging messages included in the message window 415. FIG. 4 shows three instant messaging messages in the message window 415. The three instant messaging messages are labeled, left to right, "Profile picture 1", "Profile picture 1" and "Profile picture 2" and are denoted by B, C, and D respectively. When the message window 415 is around these three messages, the instant messaging messages B*, C*, and D* corresponding to B, C, and D, respectively, are shown on the first picture at their respective display locations. When the first user wants to change the instant messaging messages displayed on the first chat interface, the first user moves the message window 415 around other instant messaging messages to generate a command as a selection instruction and submit the selection instruction to the first terminal. The first terminal obtains the selection command submitted by the first user by moving the message window 415 in the message progress bar 410. For example, if the user moves the message window 415 one Profile picture 1 to the left, such that the message window 415 includes "Profile Picture 1" denoted by A but no longer includes "Profile picture 2" denoted by D, the instant messaging message D* would be removed from the first chat interface and an instant messaging message A* would be displayed at its corresponding display location on the first picture in the first chat interface.

The operation of submitting a selection instruction to the first terminal by the first user by moving a message window 415 in the message progress bar 410 may use the following four manners that are respectively as follows:

First manner: The first user may drag the message window 415 and slide the message window 415 leftwards to submit the selection instruction to the first terminal.

If the first user wants to select an instant messaging message in the message progress bar 410 that is on the left of the message window 415, the first user may drag the message window 415 leftwards, to slide the message window 415 leftwards.

Second manner: The first user may drag the message window 415 and slides the message window 415 rightwards to submit the selection instruction to the first terminal.

If the first user wants to select an instant messaging message on the right of the message window 415 in the message progress bar 410, the first user may drag the message window 415 rightwards, to slide the message window 415 rightwards.

Third manner: The first user may tap a left button 420 in the message progress bar 410 to submit the selection instruction to the first terminal, the left button 420 being used for moving the message window 415 leftwards.

Referring to FIG. 4, there is a left button 420 on the left-most side of the message progress bar 410. When the left button 420 is tapped, the left button 420 may trigger the terminal to move the message window 415 leftwards. In some exemplary embodiments, each time when the left button 420 is tapped, the message window 415 may move leftwards by one instant messaging message, that is, the instant messaging message enters the message window 415 from the left of the message window 415. For example, A enters the message window 415.

If the first user wants to select an instant messaging message in the message progress bar 410 that is on the left of the message window 415, the first user may tap the left button 420, to slide the message window 415 leftwards. If the first user only chooses to slide the message window 415 leftwards for one instant messaging message, the first user may tap the left button 420 once. If the first user chooses to slide the message window 415 leftwards for multiple instant messaging messages, the first user may continuously tap the left button 420 many times.

Fourth manner: The first user may tap a right button 430 in the message progress bar 410 to submit the selection instruction to the first terminal, the right button 430 being used for moving the message window 415 rightwards.

Referring to FIG. 4, there is a right button 430 on the right-most side of the message progress bar 410. When the right button 430 is tapped, the right button 430 may trigger the terminal to move the message window 415 rightwards. In some exemplary embodiments, each time when the right button 430 is tapped, the message window 415 may move rightwards by one instant messaging message, that is, the instant messaging message enters the message window 415 from the right of the message window 415. For example, E enters the message window 415.

If the first user wants to select an instant messaging message in the message progress bar 410 that is on the right of the message window 415, the first user may tap the right button 430, to slide the message window 415 rightwards. If the first user only chooses to slide the message window 415 rightwards for one instant messaging message, the first user may tap the right button 430 once. If the first user chooses to slide the message window 415 rightwards for multiple instant messaging messages, the first user may continuously tap the right button 430 many times.

Instant messaging messages in the message progress bar 410 are sorted in a sequence of the receiving time from far to close to a current time. In addition, the receiving time of an instant messaging message on the left in the message progress bar 410 is relatively far away from the current time, and the receiving time of an instant messaging message on the right is relatively close to the current time.

If the first user chooses an instant messaging message having a receiving time relatively far away from the current receiving time, the first user may drag the message window 415 and slide the message window 415 leftwards, or may tap the left button in message progress bar 410 to slide the message window 415 leftwards. In this way, the message window 415 includes the instant messaging message that is selected by the first user and that has the receiving time relatively far away from the current receiving time. If the first user chooses an instant messaging message having a receiving time relatively close to the current receiving time, the first user drags the message window 415 and slides the message window 415 rightwards, or taps the right button 430 in message progress bar 410 to slide the message window 415 rightwards. In this way, the message window 415 includes the instant messaging message that is selected by the first user and that has a receiving time relatively close to the current receiving time.

Each time when the first user drags the message window 415 and slides the message window 415, a minimum unit of an instant messaging message that is slid in or slid out is one instant messaging message. However, this is not an example, and in some exemplary embodiments, the minimum unit may be two or more.

The first user may further change the size of the message window 415, to change the quantity of selected instant messaging messages. Details are as follows:

The first user may reduce the size of the message window 415 by means of an "zoom-in" gesture, so as to decrease the quantity of instant messaging messages included in the message window 415. The size may be reduced until the quantity of the instant messaging messages included in the message window 415 is 1. Alternatively, the first user may enlarge the size of the message window 415 by means of a "zoom-out" gesture, so as to increase the quantity of instant messaging messages included in the message window 415 until the quantity of selected instant messaging messages is N.

N is greater than 1 and less than a quantity of instant messaging messages received by the first terminal that may be displayed within the message progress bar 410.

(2): Obtain, according to a selection command, an instant messaging message included in the message window 415 as the third instant messaging message selected by the first user.

Operation 206: Display the third instant messaging message on the first chat interface, and hide, on the first chat interface, an instant messaging message in the message progress bar 410 that is not selected.

When the first user wants to display the instant messaging message hidden on the first chat interface, the first user may select, from the message progress bar 410 by sliding the message window 415, the instant messaging message hidden and not currently displayed on the first chat interface. For example, in FIG. 4, the message window 415 may be slide to select A.

Further, to improve the display effect of displaying the instant messaging message, in some exemplary embodiments the instant messaging messages may be displayed on the first chat interface in a play-in-turn manner. If the first user wants to display the instant messaging messages on the first chat interface in a play-in-turn manner, the first user may trigger a play-in-turn command to the first terminal.

Correspondingly, the first terminal may further play, in sequence, the instant messaging messages included on the first chat interface by means of the following operation 207 and operation 208.

Operation 207: Obtain a play-in-turn command triggered by the first user.

In some exemplary embodiments, the first chat interface may include a play-in-turn button (not shown). The user may trigger the play-in-turn command to the first terminal by tapping the play-in-turn button. The first terminal obtains the play-in-turn command triggered by the first user.

Operation 208: Play instant messaging messages on the first chat interface in sequence at a time interval according to the play-in-turn command and the receiving time of the instant messaging messages included on the first chat interface. The time interval may be preset. For example, the time interval may be 3 instant messaging message per 10 seconds, etc.

The operation may be implemented by means of the following operation (1) and operation (2), including:

(1): Obtain a receiving time of the instant messaging messages included on the first chat interface.

When the first terminal displays the instant messaging messages on the first chat interface, the first terminal also displays the receiving time of the instant messaging messages. Therefore, in the operation (1), the first terminal obtains the receiving time of the instant messaging messages on the first chat interface.

(2): Play the instant messaging messages on the first chat interface in sequence at a time interval according to the play-in-turn command and the receiving time of the instant messaging messages.

The first terminal sorts, based on the receiving time of the instant messaging messages, the instant messaging messages in a sequence of the receiving time from far to close to a current time, to obtain a message sequence. The message sequence includes the sorted instant messaging messages. The first instant messaging message included in the message sequence is an instant messaging message whose receiving time is the farthest away from the current time, and the last instant messaging message is an instant messaging message whose receiving time is the closest to the current time. The instant messaging messages included in the message sequence are played, on the first chat interface at the time interval, in sequence starting from the first instant messaging message in the message sequence.

When the last instant messaging message in the message sequence is played, the first terminal continues playing, in sequence starting from the first instant messaging message in the message sequence, the instant messaging messages included in the message sequence until the first user triggers a stop command to the first terminal. For example, in some exemplary embodiments, the user may push a stop button or generate a stop gesture or tap with the first terminal. In addition, when the first terminal plays the instant messaging messages, if a new instant messaging message is received, for ease of description, the new instant messaging message is referred to as a fifth instant messaging message. The fifth instant messaging message is inserted into the message sequence according to the receiving time of the fifth instant messaging message.

The time interval may be set and modified by a user or by experiment, or may be set, for example, based on the number of instant messaging messages that have been received. The time interval is not specifically limited. For example, the time interval may be 2 s or 5 s.

Further, during playing of the instant messaging messages, when an instant messaging message is displayed in turn, the first user may select the instant messaging message, for example, in a case in which the user chooses to read the instant messaging message. A selection manner may be tapping the instant messaging message, or double-tapping the instant messaging message, or the like. For ease of description, the instant messaging message may be referred to as a fourth instant messaging message.

The first user may stop playing the instant messaging messages by selecting the fourth instant messaging message from the first chat interface, to facilitate careful reading of the fourth instant messaging message by the first user. In addition, when stopping playing the instant messaging messages, the first terminal may further display an operation button, to facilitate an operation of the first user based on the operation button. Specifically, the operation may be implemented by means of the following operation 209 to operation 211.

Operation 209: Obtain a stop command triggered by the first user, and obtain, according to the stop command, a fourth instant messaging message that is currently played.

When the first terminal plays the instant messaging messages in sequence, the first user may tap any location on the first chat interface to trigger the stop command to the first terminal. The first terminal obtains the stop command triggered by the first user, and obtains, according to the stop command, an instant messaging message that is currently played as the fourth instant messaging message.

Further, when the first terminal stops playing the instant messaging messages, the first user may further tap any location on the first chat interface to trigger a playing instruction to the first terminal. In some exemplary embodiments, a play button may alternatively or additionally be provided. The first terminal obtains the playing instruction triggered by the first user, and plays, according to the playing instruction, the instant messaging messages starting from the fourth instant messaging message.

Operation 210: Display an operation button on the first chat interface, and obtain an operation command triggered by the first user by tapping the operation button.

The operation may be implemented by means of the following operation (1) to operation (3), including:

(1) Display the operation button on the first chat interface.

The operation button may include, but is not limited to, a reply button for replying the instant messaging message, a replication button for replicating the instant messaging message, a viewing button for viewing personal information of a user sending the fourth instant messaging message, a dial button for dialing a phone number of a user sending the fourth instant messaging message, a chat button for initiating a private chat with a user sending the fourth instant messaging message, a Like button for Liking the fourth instant messaging message, a report button, or the like.

In addition, if the fourth instant messaging message is sent by the first user or the first user is a manager of the group, the operation button may be a withdraw button for withdrawing the fourth instant messaging message.

(2): Check the operation button.

The first user may tap the operation button to trigger an operation command to the first terminal. The first terminal checks the operation button in real time. If the operation command triggered by the first user by tapping the operation button is detected, perform operation (3). Alternatively, if the operation command triggered by the first user by tapping the operation button is not detected, the procedure ends.

(3): When detecting the operation command triggered by the first user by tapping the operation button, obtain the operation command.

If the operation button tapped by the first user is a reply button for replying the instant messaging message, the operation command is a reply command. If the operation button tapped by the first user is a replication button for replicating the instant messaging message, the operation command is a replication command. If the operation button tapped by the first user is a viewing button for viewing contact information of a user sending the fourth instant messaging message, the operation command is a viewing command. If the operation button tapped by the first user is a dial button for dialing a phone number of a user sending the fourth instant messaging message, the operation command is a dial command. If the operation button tapped by the first user is a chat button for initiating a private chat with a user sending the fourth instant messaging message, the operation command is a chat command. If the operation button tapped by the first user is a Like button for Liking the instant messaging message, the operation command is a Like command. If the operation button tapped by the first user is a report button, the operation command is a report command.

Operation 211: Perform, according to the fourth instant messaging message, an operation corresponding to the operation command.

If the operation command is a reply command, an input box is displayed according to the reply command, a sixth instant messaging message entered by the first user in the input box is obtained, and the sixth instant messaging message is sent to a terminal sending the fourth instant messaging message, to reply the fourth instant messaging message.

If the operation command is a replication command, the fourth instant messaging message is replicated according to the replication command.

If the operation command is a viewing command, a user identifier of a user sending the fourth instant messaging message is obtained, the viewing command is sent to the instant messaging server, the viewing command carrying the obtained user identifier of the user, and contact information of the user that is obtained by the instant messaging server according to the user identifier is received.

If the operation command is a dial command, a phone number of a user sending the fourth instant messaging message is obtained according to the dial command, and the phone number is dialed.

If the operation command is a chat command, a chat interface is additionally opened according to the chat command, a seventh instant messaging message entered by the first user on the input interface is obtained, and the seventh instant messaging message is sent to a terminal sending the fourth instant messaging message, to chat with a user sending the fourth instant messaging message.

If the operation command is a Like command, the fourth instant messaging message is liked according to the operation command.

If the operation command is a report command, a report request is sent to the instant messaging server according to the report command. The report request carries a user identifier of a user sending the fourth instant messaging message.

Further, the first user may search for, according to a user identifier, an instant messaging message corresponding to the user identifier, and the first implementation manner below is used for implementation. In some exemplary embodiments, the first user may search for, according to a keyword, an instant messaging message that includes the keyword, and the second implementation manner below is used for implementation. The first manner may be implemented by means of the following operation (1) and operation (2), including:

(1): Obtain a user identifier of a user to be searched for that is selected by the first user.

The first user may tap an instant messaging message on the first chat interface to select a user identifier of a user sending the instant messaging message as the user identifier of the user to be searched for. In some exemplary embodiments, the first user may enter, in an input box, the user identifier of the user to be searched for. The first terminal obtains the user identifier of the user to be searched for that is entered by the first user.

(2): Display, according to the user identifier of the user to be searched for, an instant messaging message of the user to be searched for on the first chat interface in a special-effect displaying manner.

The special-effect displaying manner may be highlighting the instant messaging message of the user to be searched for. The special-effect displaying manner may be preset. During actual implementation, the font of the instant messaging message of the user to be searched for may be displayed in boldface, an underline may be added under the instant messaging message of the user to be searched for, or a background color may be set for the instant messaging message of the user to be searched for. The background color may be preset.

In some exemplary embodiments, operation (2) may be implemented by means of the following operation (2-1) and operation (2-2), including:

(2-1): Select, from the first chat interface according to the user identifier of the user to be searched for, the instant messaging message sent by the user to be searched for.

The first chat interface may include instant messaging messages and user identifiers of users sending the instant messaging messages. In the operation (2-1), the instant messaging message sent by the selected user may be selected from the first chat interface according to the user identifier of the user to be searched for.

(2-2): Display the instant messaging message sent by the user to be searched for on the first chat interface in the special-effect displaying manner.

The instant messaging message sent by the user to be searched for may be displayed on the first chat interface in the special-effect displaying manner, and other instant messaging messages on the first chat interface other than the instant messaging message sent by the user to be searched for may be displayed according to a default rule, so that the first user may view context information of the instant messaging message sent by the user to be searched for.

In some exemplary embodiments, the instant messaging message sent by the user to be searched for may be displayed on the first chat interface, and other instant messaging messages on the first chat interface that are sent by other users other than the user to be searched for may be hidden or greyed out on the first chat interface, so that the instant messaging message sent by the user to be searched for may be displayed on a same screen more clearly.

In some exemplary embodiments, it is determined according to the quantity of instant messaging messages included in the message window 415 whether to hide instant messaging messages on the first chat interface that are sent by other users other than the user to be searched for. If the quantity of the instant messaging messages included in the message window 415 is greater than a threshold quantity, the instant messaging message sent by the user to be searched for is displayed on the first chat interface, and the instant messaging messages on the first chat interface that are sent by the other users are hidden. The threshold quantity may be preset. If the quantity of the instant messaging messages included in the message window 415 is not greater than the preset quantity, the first terminal highlights the instant messaging message sent by the user to be searched for on the first chat interface in the special-effect displaying manner, and the instant messaging messages on the first chat interface that are sent by the other users are displayed according to a default rule.

The threshold quantity may be set and modified. The threshold quantity is not specifically limited. For example, the threshold quantity may be about 8 or about 10 instant messaging messages.

The second manner may be implemented by means of the following operation (A) to operation (C), including:

(A): Obtain a keyword entered by the first user.

The first user may enter the keyword in a search input box, and the first terminal obtains the keyword entered by the first user.

(B): Select, according to the keyword, an instant messaging message including the keyword from the first chat interface.

(C): Highlight the selected instant messaging message on the first chat interface in a special-effect displaying manner.

The operation (C) is the same as operation (2) described above, and details are not described again for conciseness.

When sending a first instant messaging message to a first user, a second user selects a first display location on a first picture displayed on a second chat interface of a second terminal. The second terminal sends the first instant messaging message and the first display location to a first terminal, so that the first terminal displays, according to the first display location, the first instant messaging message on a first picture displayed on a first chat interface. In this way, the first user can view the first picture without dragging a scroll bar, and can view the first instant messaging message with reference to the first picture without dragging the scroll bar, thereby improving the viewing efficiency.

Figure 5:
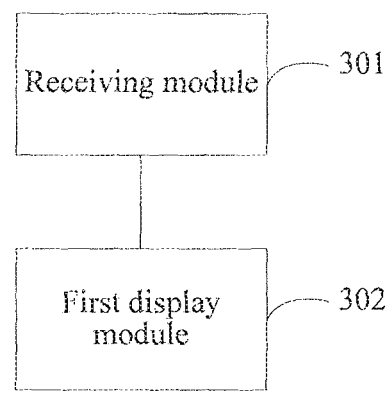
FIG. 5 is a schematic structural diagram of an apparatus for displaying an instant messaging message according to another exemplary embodiment.

FIG. 5 is a schematic structural diagram of an apparatus for displaying an instant messaging message according to another exemplary embodiment. The apparatus displays an instant messaging message. The apparatus displays a first chat interface, a second terminal displays a second chat interface, the first chat interface displays a first picture, the second chat interface displays a second picture, and the first picture is the same as the second picture. Referring to FIG. 5, the apparatus includes:

a receiving module 301, configured to receive a first instant messaging message and a first display location that are sent by the second terminal, the first display location being a location selected by a second user on the second picture displayed on the second chat interface, and the first instant messaging message being displayed at the first display location on the second chat interface; and a first display module 302, configured to display, according to the first display location, the first instant messaging message on the first picture displayed on the first chat interface.

Figure 6:
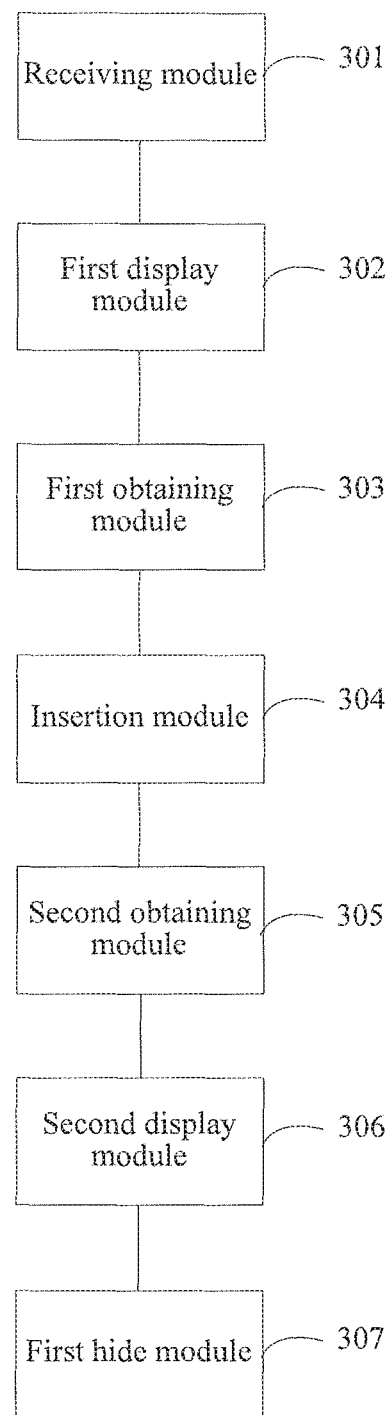
FIG. 6 is a schematic structural diagram of another apparatus for displaying an instant messaging message according to an exemplary embodiment.

FIG. 6 is a schematic structural diagram of another apparatus for displaying an instant messaging message according to an exemplary embodiment. Referring to FIG. 6, in addition to the receiving module 301 and the first display module 302, the apparatus may further include:

a first obtaining module 303, configured to obtain the receiving time of receiving the first instant messaging message; and an insertion module 304, configured to insert, according to the receiving time, the first instant messaging message into a message progress bar 410 included on the first chat interface.

Further, the apparatus may further include:

a second obtaining module 305, configured to obtain a third instant messaging message selected by a first user from the message progress bar 410;

a second display module 306, configured to display the third instant messaging message on the first chat interface; and a first hide module 307, configured to hide an instant messaging message in the message progress bar 410 that is not selected.

Figure 7:
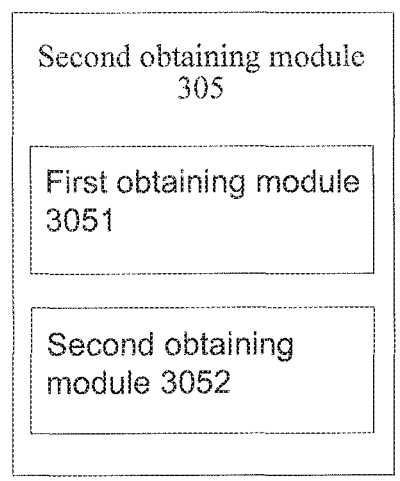
FIG. 7 is a schematic structural diagram of a second obtaining module of the apparatus of FIG. 6.

FIG. 7 is a schematic structural diagram of a second obtaining module of the apparatus of FIG. 6. Referring to FIG. 7, the second obtaining module 305 may include:

a first obtaining module 3051, configured to obtain a selection command submitted by the first user by moving a message window 415 in the message progress bar 410; and a second obtaining module 3052, configured to obtain, according to the selection command, an instant messaging message included in the message window 415 as the third instant messaging message selected by the first user.

Figure 8:
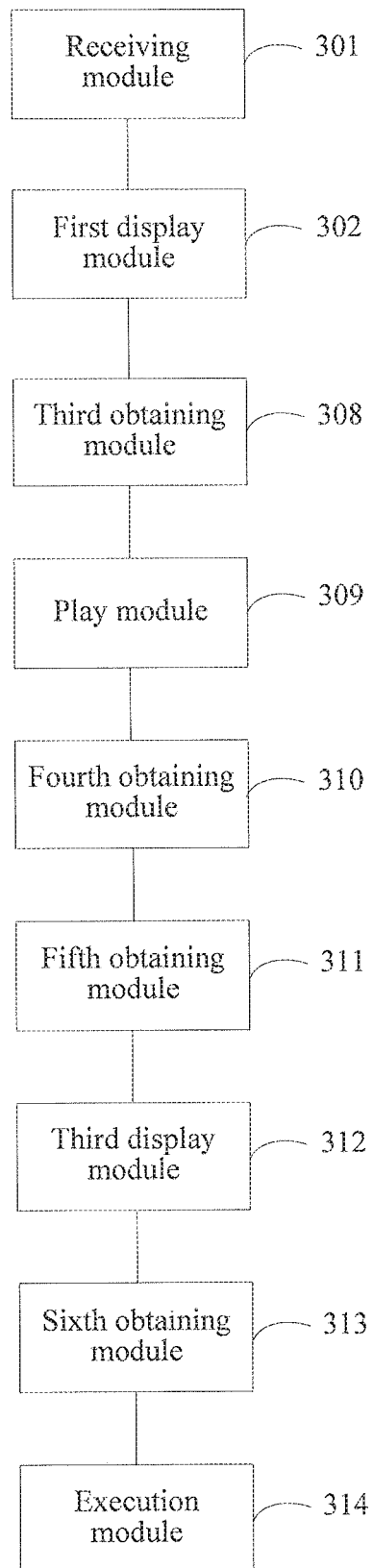
FIG. 8 is a schematic structural diagram of another apparatus for displaying an instant messaging message according to an exemplary embodiment.

FIG. 8 is a schematic structural diagram of another apparatus for displaying an instant messaging message according to an exemplary embodiment. Referring to FIG. 8, in addition to the receiving module 301 and the first display module 302, the apparatus may further include:

a third obtaining module 308, configured to obtain a play-in-turn command triggered by the first user; and a play module 309, configured to play instant messaging messages on the first chat interface in sequence at a time interval according to the play-in-turn command and the receiving time of the instant messaging messages included on the first chat interface.

The apparatus may further include:

a fourth obtaining module 310, configured to obtain a stop command triggered by the first user;

a fifth obtaining module 311, configured to obtain, according to the stop command, a fourth instant messaging message that is currently played;

a third display module 312, configured to display an operation button on the first chat interface;

a sixth obtaining module 313, configured to obtain an operation command triggered by the first user by tapping the operation button; and an execution module 314, configured to perform, according to the fourth instant messaging message, an operation corresponding to the operation command.

Figure 9:
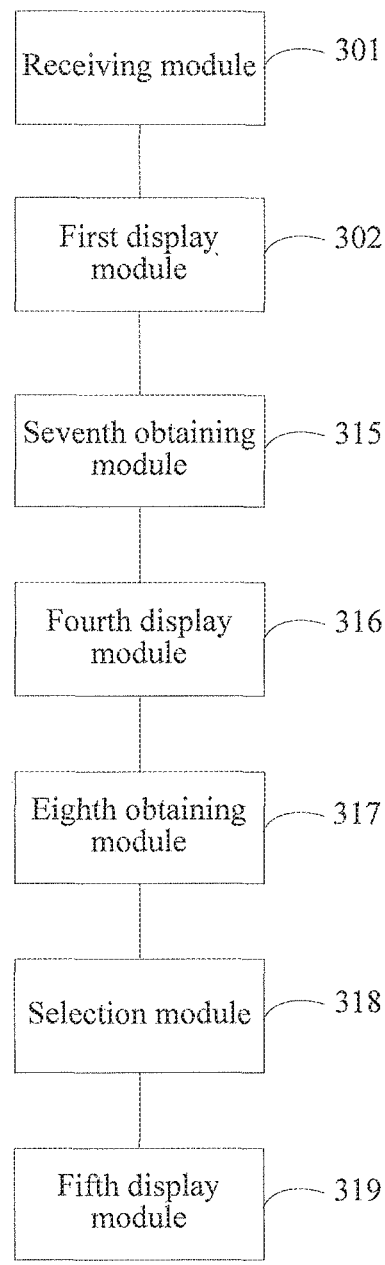
FIG. 9 is a schematic structural diagram of another apparatus for displaying an instant messaging message according to an exemplary embodiment.

FIG. 9 is a schematic structural diagram of another apparatus for displaying an instant messaging message according to an exemplary embodiment. Referring to FIG. 9, in addition to the receiving module 301 and the first display module 302, the apparatus may further include:

a seventh obtaining module 315, configured to obtain a user identifier of a user selected by the first user; and a fourth display module 316, configured to highlight, on the first chat interface according to the user identifier of the selected user, an instant messaging message sent by the selected user.

The apparatus may further include:

an eighth obtaining module 317, configured to obtain a keyword entered by the first user;

a selection module 318, configured to select, according to the keyword, an instant messaging message matching the keyword from the first chat interface; and a fifth display module 319, configured to highlight the selected instant messaging message on the first chat interface.

When sending a first instant messaging message to a first user, a second user selects a first display location on a second picture displayed on a second chat interface of a second terminal. The second terminal sends the first instant messaging message and the first display location to the apparatus, so that the apparatus displays, according to the first display location, the first instant messaging message on a first picture displayed on a first chat interface. In this way, the first user can view the first picture without dragging a scroll bar, and can view the first instant messaging message with reference to the first picture without dragging the scroll bar, thereby improving the viewing efficiency.

Figure 10:
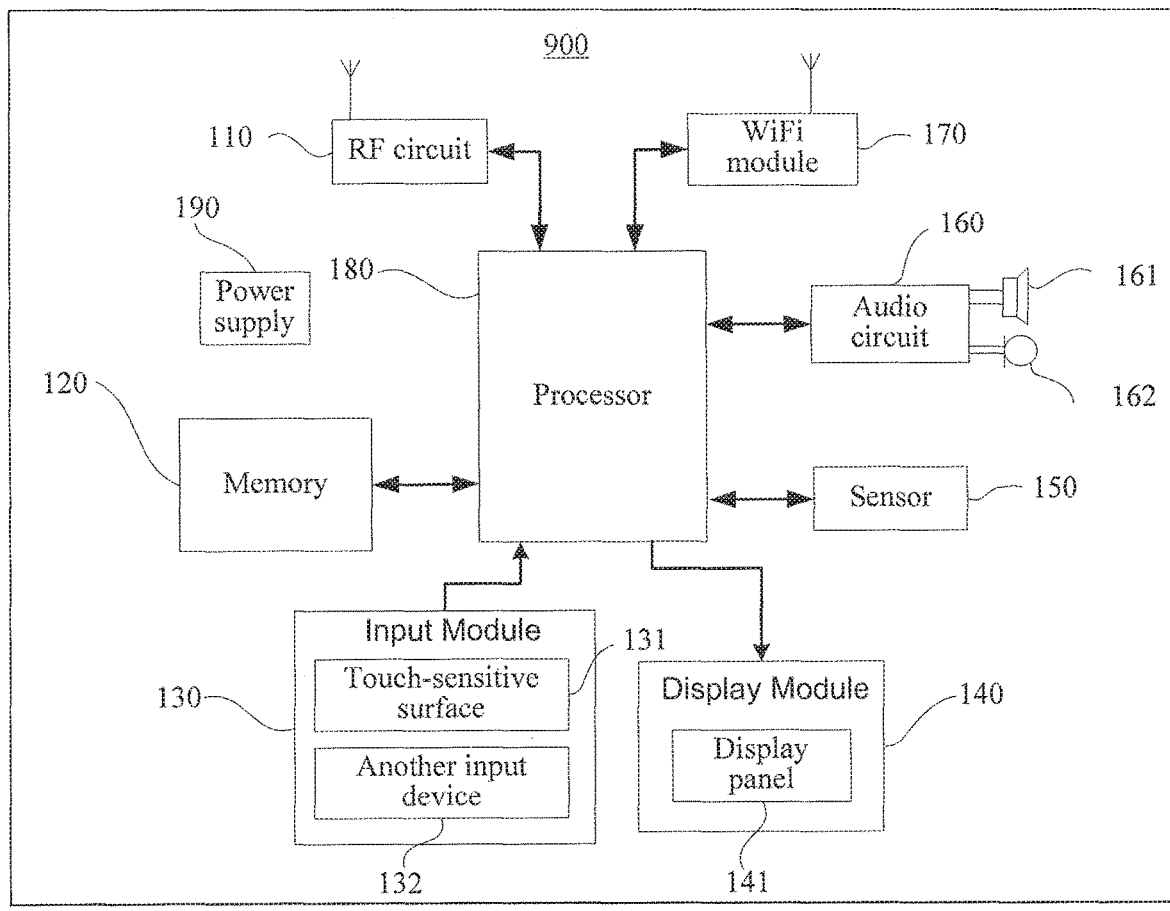
FIG. 10 is a schematic structural diagram of an apparatus for displaying an instant messaging message according to the exemplary embodiments.

FIG. 10 is a schematic structural diagram of an apparatus for displaying an instant messaging message according to the exemplary embodiments. Referring to FIG. 10, FIG. 10 is a schematic structural diagram of a first terminal 900 having a touch-sensitive surface on which various exemplary embodiments above may be implemented. The first terminal 900 provides a running environment for the apparatus for displaying an instant messaging message provided in FIGS. 5-9 described above. Details are as follows.

The first terminal 900 may include components such as a Radio Frequency (RF) circuit 110, a memory 120 including one or more computer readable storage mediums, an input module 130, a display 140, a sensor 150, an audio circuit 160, a wireless fidelity (WiFi) module 170, a processor 180 including one or more processing cores, and a power supply 190. A person skilled in the art may understand that the structure of the first terminal 900 shown in FIG. 10 does not constitute a limitation to the first terminal 900, and the first terminal 900 may include more components or fewer components than those shown in the FIG. 10, or some components may be combined, or a different component deployment may be used.

The RF circuit 110 may be configured to receive and send signals in an information receiving and sending process or a call process. Particularly, the RF circuit 110 receives downlink information from a base station, then delivers the downlink information to the one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a Low Noise Amplifier (LNA), a duplexer, and the like. In addition, the RF circuit 110 may also communicate with a network and another device by means of wireless communication. The wireless communication may use any communications standard or protocol, which includes, but is not limited to, GSM (Global System for Mobile communication), GPRS (General Packet Radio Service), CDMA (Code Division Multiple Access), WCDMA (Wideband Code Division Multiple Access), LTE (Long Term Evolution), e-mail, SMS (Short Messaging Service), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the first terminal 900, and the like. In addition, the memory 120 may include a high speed random access memory, and may also include a non-volatile memory such as at least one magnetic disk storage device, a flash memory, or another volatile solid-state storage device. Correspondingly, the memory 120 may further include a memory controller, to provide access of the processor 180 and the input module 130 to the memory 120.

The input module 130 may be configured to receive input digit or character information, and generate a keyboard, mouse, joystick, optical or track ball signal input related to the user setting and function control. Specifically, the input module 130 may include a touch-sensitive surface 131 and another input device 132. The touch-sensitive surface 131, which may also be referred to as a touch display screen or a touch control board, may collect a touch operation of a user on or near the touch-sensitive surface (such as an operation of a user on or near the touch-sensitive surface 131 by using any suitable object or accessory such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using a type such as a resistive, capacitive, infrared, or surface sound wave type. In addition to the touch-sensitive surface 131, the input module 130 may further include the another input device 132. Specifically, the another input device 132 may include, but is not limited to, one or more of a physical keyboard, a functional key (such as a volume control key or a switch key), a track ball, a mouse, and a joystick.

The display 140 may be configured to display information input by the user or information provided for the user and various graphical user interfaces of the first terminal 900. These graphical user interfaces may be constituted by an image, a text, an icon, a video, and any combination of them. The display 140 may include a display panel 141. Optionally, the display panel 141 may be configured by using an LCD (Liquid Crystal Display), an OLED (Organic Light-Emitting Diode), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 10, the touch-sensitive surface 131 and the display panel 141 are used as two separate parts to implement input and output functions, in some embodiments, the touch-sensitive surface 131 and the display panel 141 may be integrated to implement the input and output functions.

The first terminal 900 may further include at least one sensor 150 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the first terminal 900 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the first terminal 900, are not further described herein.

The audio circuit 160, a speaker 161, and a microphone 162 may provide audio interfaces between the user and the first terminal 900. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the first terminal 900.

WiFi belongs to a short distance wireless transmission technology. The first terminal 900 may help, by using the WiFi module 170 170, the user receive and send e-mails, browse a web page, access streaming media, and so on, which provides wireless broadband Internet access for the user. Although FIG. 10 shows the WiFi module 170, it may be understood that the WiFi module is not a necessary component of the first terminal 900, and may be omitted as long as the scope of the essence of the present disclosure is not changed.

The processor 180 is the control center of the first terminal 900, and is connected to various parts of the mobile phone by using various interfaces and lines. The processor 180 may be one or more microprocessors or central processing units (CPUs). By running or executing the software program and/or module stored in the memory 120, and invoking data stored in the memory 120, the processor 180 performs various functions and data processing of the first terminal 900, thereby performing overall monitoring on the mobile phone. Optionally, the processor 180 may include the one or more processing cores. The processor 180 may integrate an application processor and a modem. The application processor mainly processes an operating system, a user interface, an application program, and the like. The modem mainly processes wireless communication. It may be understood that the foregoing modem may be provided separately from and thus not be integrated into the processor 180.

The first terminal 900 further includes the power supply 190 (such as a battery) for supplying power to the components. The power supply may be logically connected to the processor 180 by using a power management system, thereby implementing functions such as charging, discharging and power consumption management by using the power management system. The power supply 190 may further include any component such as one or more direct-current or alternating current power supplies, a recharge system, a power-supply failure detection circuit, a power-supply converter, an inverter, a power state indicator.

Although not shown in the figure, the first terminal 900 may further include a camera, a Bluetooth module, and the like, which are not further described herein. Specifically, the display of the first terminal 900 may be a touch screen display, and the first terminal 900 may further include a memory and one or more programs. The one or more programs are stored in the memory and configured to be executed by one or more processors. The one or more programs contain instructions for performing the following operations:

A first terminal displays a first chat interface, a second terminal displays a second chat interface, the first chat interface displays a first picture, the second chat interface displays a second picture, and the first picture is the same as the second picture. The method includes:

receiving, by the first terminal, a first instant messaging message and a first display location that are sent by the second terminal, the first display location being a location selected by a second user on the second picture displayed on the second chat interface, and the first instant messaging message being displayed at the first display location on the second chat interface; and displaying, according to the first display location, the first instant messaging message on the first picture displayed on the first chat interface.

Further, after the receiving, by the first terminal, a first instant messaging message and a first display location that are sent by the second terminal, the method may further include:

obtaining the receiving time of receiving the first instant messaging message; and inserting, according to the receiving time, the first instant messaging message into a message progress bar 410 included on the first chat interface.

Further, the method may further include:

obtaining a third instant messaging message selected by a first user from the message progress bar 410; and displaying the third instant messaging message on the first chat interface, and hiding an instant messaging message in the message progress bar 410 that is not selected.

Further, the obtaining a third instant messaging message selected by a first user from the message progress bar 410 may include:

obtaining a selection command submitted by the first user by moving a message window 415 in the message progress bar 410; and obtaining, according to the selection command, an instant messaging message included in the message window 415 as the third instant messaging message selected by the first user.

Further, the method may further include:
obtaining a play-in-turn command triggered by the first user; and
playing instant messaging messages on the first chat interface in sequence at a preset time interval according to the play-in-turn command and the receiving time of the instant messaging messages included on the first chat interface.

Further, the method may further include:
obtaining a stop command triggered by the first user;
obtaining, according to the stop command, a fourth instant messaging message that is currently played;
displaying an operation button on the first chat interface, and obtaining an operation command triggered by the first user by tapping the operation button; and
performing, according to the fourth instant messaging message, an operation corresponding to the operation command.

Further, the method may further include:
obtaining a user identifier of a user selected by the first user; and
highlighting, on the first chat interface according to the user identifier of the selected user, an instant messaging message sent by the selected user.

Further, the method may further include:
obtaining a keyword entered by the first user;
selecting, according to the keyword, an instant messaging message matching the keyword from the first chat interface; and
highlighting the selected instant messaging message on the first chat interface.

When sending a first instant messaging message to a first user, a second user selects a first display location on a second picture displayed on a second chat interface of a second terminal. The second terminal sends the first instant messaging message and the first display location to a first terminal, so that the first terminal displays, according to the first display location, the first instant messaging message on a first picture displayed on a first chat interface. In this way, the first user can view the first picture without dragging a scroll bar, and can view the first instant messaging message with reference to the first picture without dragging the scroll bar, thereby improving the viewing efficiency.

In an exemplary embodiment, a non-temporary computer readable storage medium including instructions, for example, a memory including instructions, is further provided. The instructions may be executed by a processor of a terminal to implement the method for displaying an instant messaging message. For example, the non-temporary computer readable storage medium may be a ROM, a random access memory (RAM), a CD-ROM, a tape, a floppy disk, or an optical data storage device.

It should be noted that division of the above functional modules are only described as an example when the apparatus for displaying an instant messaging message provided in the foregoing embodiments displays an instant messaging message. In actual applications, the functions may be allocated according to needs to be implemented by different functional modules, that is, the internal structure of the apparatus is divided into different functional modules to complete all or some of the above described functions. In addition, the apparatus for displaying an instant messaging message provided in the foregoing embodiment are based on the same concept as the method for displaying an instant messaging message in the foregoing embodiments. For the specific implementation process, refer to the method embodiments, and the details are not described herein again.

A person of ordinary skill in the art may understand that all or some of the operations of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

What is described above is merely an example of various exemplary embodiments, and is not intended to limit the present disclosure. Any modifications, equivalent variations, and improvements made in accordance with the spirits and principles of the present disclosure shall fall within the protection scope of the attached claims.

What is claimed is:

1. A method for displaying an instant messaging message, the method comprising:
receiving, by a first terminal in an ongoing instant messaging (IM) communication session with a second terminal, a first instant messaging message and a first display location from the second terminal, the first terminal displaying a first alternate IM chat interface, the second terminal displaying a second alternate IM chat interface, the first alternate IM chat interface displaying a first picture as a prior instant messaging message prior to receiving the first instant messaging message and the first display location, the second alternate IM chat interface displaying a second picture as the prior instant messaging message prior to transmitting the first instant messaging message and the first display location that is the same as the first picture, the first display location being a location on the second picture; and
displaying, according to the first display location, the first instant messaging message on the first picture displayed on the first alternate IM chat interface,
wherein the first alternate IM chat interface comprises a switching button configured to switch from the first alternate IM chat interface to a fourth IM chat interface, and
wherein the fourth IM chat interface is a chat interface that displays a plurality of instant messaging messages according to receiving times of the plurality of instant messaging messages.

2. The method according to claim 1, wherein the first terminal displays a message progress bar on the first alternate IM chat interface, and
wherein, after the first instant messaging message and the first display location are received, the method further comprises:
inserting, according to a receiving time of the first instant messaging message, an indicator of the first instant messaging message into the message progress bar.

3. The method according to claim 2, wherein an indicator of a third instant messaging message is displayed in the message progress bar, and
the method further comprises:
obtaining a selection of the indicator of the third instant messaging message in the message progress bar; and
displaying the third instant messaging message on the first alternate IM chat interface, and hiding an instant messaging message corresponding to an indicator in the message progress bar that is not selected.

4. The method according to claim 3, wherein the selection of the indicator is obtained by moving a message window in the message progress bar and selecting one or more indicators located within the message window.

5. The method according to claim 1, wherein a plurality of instant messaging messages are displayed at respective display locations on the first picture, and wherein the method further comprises:

obtaining a play-in-turn command triggered by a user; and playing instant messaging messages on the first alternate IM chat interface in sequence at a time interval according to the play-in-turn command and the receiving times of the plurality of instant messaging messages displayed on the first picture.

6. The method according to claim 5, wherein the method further comprises:

obtaining a stop command triggered by the user;

obtaining, according to the stop command, a fourth instant messaging message that is currently played;

displaying an operation button on the first alternate IM chat interface, and obtaining an operation command triggered by the user by tapping the operation button; and performing, according to the fourth instant messaging message, an operation corresponding to the operation command.

7. The method according to claim 1, wherein the method further comprises:

obtaining a user identifier of a user to be searched for that is selected by a user of the first terminal; and displaying, according to the user identifier of the user to be searched for, an instant messaging message sent by the user to be searched for on the first alternate IM chat interface, the instant messaging message being displayed with a special-effect.

8. The method according to claim 1, wherein the method further comprises:

obtaining a keyword entered by a user of the first terminal;

selecting, according to the keyword, an instant messaging message including the keyword from the first alternate IM chat interface; and displaying the selected instant messaging message on the first alternate IM chat interface with a special-effect.

9. A terminal for displaying an instant messaging message in an ongoing instant messaging (IM) communication session with a second terminal, the terminal comprising:

one or more processors; and a memory, the memory storing one or more programs, the one or more programs being configured to be executed by the one or more processors, and the one or more programs comprising instructions for performing the following operations:

receiving a first instant messaging message and a first display location from a second terminal, the terminal displaying a first alternate IM chat interface, the second terminal displaying a second alternate IM chat interface, the first alternate IM chat interface displaying a first picture as a prior instant messaging message prior to receiving the first instant messaging message and the first display location, the second alternate IM chat interface displaying a second picture as the prior instant messaging message prior to transmitting the first instant messaging message and the first display location that is the same as the first picture, the first display location being a location for displaying the first instant messaging message on the second picture; and displaying, according to the first display location, the first instant messaging message on the first picture displayed on the first alternate IM chat interface, wherein the first alternate IM chat interface comprises a switching button configured to switch from the first alternate IM chat interface to a fourth IM chat interface, and wherein the fourth IM chat interface is a chat interface that displays a plurality of instant messaging messages according to receiving times of the plurality of instant messaging messages.

10. The terminal according to claim 9, the first terminal displays a message progress bar on the first alternate IM chat interface, and wherein the one or more programs further comprise an instruction for performing the following operation:

inserting, according to a receiving time of the first instant messaging message, an indicator of the first instant messaging message into the message progress bar.

11. The terminal according to claim 10, an indicator of a third instant messaging message is displayed in the message progress bar, and wherein the one or more programs further comprise instructions for performing the following operations:

obtaining a selection of the indicator of the third instant messaging message in the message progress bar; and displaying the third instant messaging message on the first alternate IM chat interface, and hiding an instant messaging message corresponding to an indicator in the message progress bar that is not selected.

12. The terminal according to claim 11, wherein the selection of the indicator is obtained by moving a message window in the message progress bar and selecting one or more indicators located within the message window.

13. The terminal according to claim 9, a plurality of instant messaging messages are displayed at respective display locations on the first picture, and wherein the one or more programs further comprise instructions for performing the following operations:

obtaining a play-in-turn command triggered by a user; and playing instant messaging messages on the first alternate IM chat interface in sequence at a time interval according to the play-in-turn command and the receiving times of the plurality of instant messaging messages displayed on the first picture.

14. The terminal according to claim 13, wherein the one or more programs further comprise instructions for performing the following operations:

obtaining a stop command triggered by the user;

obtaining, according to the stop command, a fourth instant messaging message that is currently played;

displaying an operation button on the first alternate IM chat interface;

obtaining an operation command triggered by the user by tapping the operation button; and performing, according to the fourth instant messaging message, an operation corresponding to the operation command.

15. The terminal according to claim 9, wherein the one or more programs further comprise instructions for performing the following operations:

obtaining a user identifier of a user to be searched for that is selected by a user of the first terminal; and displaying, according to the user identifier of the user to be searched for, an instant messaging message sent by the user to be searched for on the first alternate IM chat interface, the instant messaging message being displayed with a special-effect.

16. The terminal according to claim 9, wherein the one or more programs further comprise instructions for performing the following operations:

obtaining a keyword entered by a user of the first terminal;

selecting, according to the keyword, an instant messaging message including the keyword from the first alternate IM chat interface; and displaying the selected instant messaging message on the first alternate IM chat interface with a special-effect.

17. An instant messaging method performed by a first terminal in an ongoing instant messaging (IM) communication session with a second terminal, the instant messaging method comprising:

displaying a picture as a prior instant messaging message in the ongoing IM communication session on an alternate IM chat interface of the first terminal;

receiving, by the first terminal while the picture is displayed as the prior instant messaging message on the alternate IM chat interface, an IM message and a display location, where the display location indicates a location on the picture; and displaying, by at least one microprocessor, the IM message on the picture at the display location, wherein the alternate IM chat interface comprises a switching button configured to switch from the alternate IM chat interface to an IM chat interface, and wherein the IM chat interface is a chat interface that displays a plurality of IM messages according to receiving times of the plurality of IM messages.

18. The instant messaging method according to claim 17, further comprising:

receiving, by the at least one microprocessor, a plurality of additional IM messages, and for each additional IM message an associated display location on the picture; and displaying, by the at least one microprocessor, the plurality of additional IM messages on the picture at the corresponding associated display location of the additional IM messages on the alternate IM chat interface.

19. The instant messaging method according to claim 18, wherein the first terminal includes a message progress bar on the alternate IM chat interface, wherein each of the IM message and the additional IM messages is represented by a corresponding indicator in the message progress bar, the indicators displayed in the message progress bar in an order or receipt of the corresponding IM message and additional IM messages by the first terminal.

20. The instant messaging method according to claim 19, wherein the first terminal includes a message window within the message progress bar, the message window selecting a subset of the indicators, and wherein, in response to moving the message window within the message progress bar to change the subset of the indicators selected, the first terminal displays the IM messages corresponding to the selected indicators and hides from display the IM messages corresponding to the unselected indicators.

\* \* \* \* \*